United States Patent
Versluis et al.

(10) Patent No.: US 11,163,641 B2
(45) Date of Patent: Nov. 2, 2021

(54) METHOD FOR EXECUTING A QUANTUM ERROR CORRECTION CYCLE IN A QUANTUM COMPUTER

(71) Applicants: Nederlandse Organisatie voor toegepast-natuurwetenschappelijk onderzoek TNO, The Hague (NL); Technische Universiteit Delft, Delft (NL)

(72) Inventors: Richard Versluis, The Hague (NL); Leonardo DiCarlo, Delft (NL); Stefano Poletto, Delft (NL)

(73) Assignees: Nederlandse Organisatie voor toegepast-natuurwetenschappelijk onderzoek TNO, The Hague (NL); Technische Universiteit Delft, Delft (NL)

( * ) Notice: Subject to any disclaimer, the term of this patent is extended or adjusted under 35 U.S.C. 154(b) by 343 days.

(21) Appl. No.: 16/336,762

(22) PCT Filed: Sep. 26, 2017

(86) PCT No.: PCT/NL2017/050643
§ 371 (c)(1),
(2) Date: Mar. 26, 2019

(87) PCT Pub. No.: WO2018/062991
PCT Pub. Date: Apr. 5, 2018

(65) Prior Publication Data
US 2021/0279134 A1    Sep. 9, 2021

(30) Foreign Application Priority Data
Sep. 27, 2016 (EP) .................................. 16190840

(51) Int. Cl.
*G11C 29/00* (2006.01)
*G06F 11/10* (2006.01)
*G06N 10/00* (2019.01)

(52) U.S. Cl.
CPC ......... *G06F 11/1076* (2013.01); *G06N 10/00* (2019.01)

(58) Field of Classification Search
CPC ........................... G06F 11/1076; G06N 10/00
See application file for complete search history.

(56) References Cited

U.S. PATENT DOCUMENTS

| 9,111,230 B2 | 8/2015 | Gambetta et al. |
| 2012/0326720 A1 | 12/2012 | Gambetta et al. |
| 2014/0264285 A1 | 9/2014 | Chow et al. |

FOREIGN PATENT DOCUMENTS

EP    3016034 A2    5/2016

OTHER PUBLICATIONS

Ueno et al., QECOOL: On-Line Quantum Error Correction with a Superconducting Decoder for Surface Code.Mar. 2021. arViv quant-ph.. pp. 1-6.*

(Continued)

*Primary Examiner* — Samir W Rizk
(74) *Attorney, Agent, or Firm* — Leydig, Volt & Mayer, Ltd.

(57) ABSTRACT

A method for executing a quantum error correction cycle in a quantum computer provided with a substrate of qubits arranged in repeated unit cells, wherein data qubits (D1, D2, D3, D4) are coupled to respective X- and Z-ancillary qubits (X1, X2, Z1, Z2), wherein a nearest neighbor interaction is provided by detuning a transition frequency of any of the data qubits and ancillary qubits into a coupling frequency for providing a coherent 2-qubit gate, wherein said method comprises the steps of simultaneous coupling of first ones (X1, X2 or Z1, Z2) of the ancillary qubits (X1, X2, Z1, Z2)

(Continued)

with a respective neighboring data qubit; and subsequent couplings of said first ones with the other neighboring data qubits; followed by simultaneous coupling of second ones (Z1, Z2 or X1, X2) of the ancillary qubits with a neighboring data qubit; and subsequent couplings of said second ancillary qubit with the other neighboring data qubits.

17 Claims, 16 Drawing Sheets

(56) References Cited

OTHER PUBLICATIONS

Fowler et al., "Surface Codes: Towards Practical Large-Scale Quantum Computation," Phys. Rev. A, vol. 86, No. 3, 032324, pp. 1-54, XP055332246 (Oct. 26, 2012).
DiCarlo et al., "Demonstration of Two-Qubit Algorithms with a Superconducting Quantum Processor," Cornell University Library, Ithaca, NY, XP080314862, 9 pages (Mar. 11, 2009).
Berkley et al., "Entangled Macroscopic Quantum States in Two Superconducting Quits," Science, vol. 300, No. 5625, NP055351088, pp. 1548-1550 (Jun. 6, 2003).
European Patent Office, International Search Report in corresponding International Application No. PCT/NL2017/050643, dated Jan. 16, 2018 (3 pages).

\* cited by examiner

METHOD FOR EXECUTING A QUANTUM ERROR CORRECTION CYCLE IN A QUANTUM COMPUTER

CROSS-REFERENCE TO RELATED APPLICATIONS

This patent application is a U.S. National Phase of PCT International Application No. PCT/NL2017/050643, filed Sep. 26, 2017, which claims priority to European Application No. 16190840.5, filed Sep. 27, 2016, which are both expressly incorporated by reference in their entireties, including any references contained therein.

FIELD OF THE INVENTION

The invention relates to a cQED device (cQED=circuit Quantum ElectroDynamics) with superconducting qubits, 2-qubit gates generated using bus-resonators mediating qubit-qubit interactions or generated with direct coupling interactions, and a scalable method implementing the stabilizer measurements of the surface code.

BACKGROUND

It is known that quantum mechanical systems in which two or more quantum states can exist in a superposition can be used to store and process information. A two-level quantum mechanical system (or two levels of a multi-level quantum mechanical system) used to store and process 0 and 1 states or superpositions of 0 or 1 states, is generally referred to as a physical qubit.

In addition, a multiple qubits can be combined to store information. By physically connecting, and implementing appropriate interactions between physical qubits, logical 0 and 1 states can be stored in multi-qubit structures known in literature as logical qubits.

A multitude of logical qubits that is connected to exchange and process quantum information and thus perform quantum computations, is referred to as a quantum processor, quantum chip or a quantum computer.

A known arrangement is a grid of qubits with a layout on a 2D planar surface, e.g. manufactured by lithographic techniques.

Manufacturing limitations, material limitations, limitations in control accuracy, coupling and entanglement to external noise sources, interaction with external particles etc. leads to decay of the physical qubit quantum state from a desired quantum state to an incoherent state. Therefore, the information stored in the physical qubits (superpositions of 0 and 1) is inherently instable. By encoding a logical quantum state using multiple physical qubits, a much more stable system is created to store the information and make it less susceptible to external influences. Errors occurring at a low enough rate can then be detected and corrected. Although more complicated than with classical bits, this method is comparable with the use of parity bits when sending classical bits over a noisy channel. The method uses data qubits to store the quantum information and parity qubits (also known as ancillary qubits) to determine the parity between data qubits. A change in parity (called error syndrome) signals a change in one of the data qubits. Using clever connections between the data qubits and ancillary qubits to measure the parity values, errors can be detected and fixed when required.

Several methods exist and have been described in literature to create and control logical qubits and perform error corrections. Stabilizer codes are examples of such methods and allow easy encoding and easy error syndrome extraction, see for example [S. J. Devitt, W. J. Munro, and K. Nemoto, quant-ph/9712048 (1998)] for an overview and detailed explanation of stabilizer codes. One example of such stabilizer codes is known in literature as the 'surface code' and has become one of the most favorable quantum error correction codes because of its high error threshold and its requirement for nearest neighbor connection between qubits only. [A. G. Fowler, M. Mariantoni, J. M. Martinis, and A. N. Cleland, Phys. Rev. A 86, 032324 (2012)] gives a detailed introduction to the surface code.

The surface code is based on a specific hardware layout, which is described in the next paragraph. A crucial part of the surface code is the cyclic measurement of the X and Z stabilizer states (we will also use the term 'stabilizers' for 'stabilizer states'). The measurement of X and Z stabilizers and extraction of the error syndrome is called a Quantum Error Correction cycle (QEC cycle) and is described in the paragraphs thereafter.

In the surface code the physical qubits are divided in data qubits and ancillary qubits (also known as ancilla qubits, helper qubits or syndrome qubits). The data qubits and ancillary qubits are placed in a 2D-planar layout with nearest neighbor connections as shown in FIG. 1. In this figure, data qubits are represented by the letter D followed in white circles, ancillary qubits are represented by the letters X and Z in black circles. Very simplified, the X stabilizers are used to discretize and detect phase errors and the Z stabilizers are used to discretize and detect bit errors. The power of the surface code lies in the fact that it has a high fault tolerant threshold and uses nearest neighbor interactions only. The first step of the surface code is the initialization of the surface into the quiescent state, which in principle can be maintained by repeated error detection and correction cycles. The dashed lines between the qubits represent a connection between pairs of qubits to allow for an interaction between the connected qubits. Examples of coupling elements, but not limited to, are bus-resonators, waveguides or direct coupling capacitances, known in the art Accordingly, in the figure it is shown that a substrate of qubits is provided for a quantum computer, arranged in repeated unit cells wherein data qubits are coupled to respective X- and Z-ancillary qubits, the X-ancillary qubits capable of measuring a first quantum variable and the Z-ancillary qubits capable of measuring a second quantum variable of said data qubits by a nearest neighbor interaction provided only between said data qubits and said ancillary qubits.

When using Josephson-junction based qubits, for example, the coupler can be a bus resonator, or a waveguide, that serves to exchange photons between the qubits. For Josephson-junction-based qubits, these photons are usually in the GHz energy range. The QEC cycle consists of a sequence of single-qubit gates and two-qubit gates between an ancillary qubit and its four neighboring data qubits, followed by a measurement of the ancillary qubit to extract the error syndrome. A QEC cycle implements the Hadamard (H-gate) gate and conditional NOT gate (CNOT gate) to generate superposition states and entangled states. Because of practical engineering limitations and design tradeoffs gates may be used that differ from these two standard gates in the QEC cycle, but which results in exactly the same stabilizers. The H-gate for instance can be implemented as a π/2 rotation about the y-axis followed by a π rotation about the x-axis (when the initial state is |0>) or |1>), the x-rotation can be omitted). The CNOT gate can be implemented using a CZ-gate, known in the art. A H-gate can be implemented using single-qubit rotations RY ($\pi/2$) and RX ($\pi$) but for simplicity we will still denote this as a Hadamard gate H.

Qubit errors can be detected, and corrected if required, by measuring the eigenvalues of the stabilizers. A bit flip will result in a change in the eigenvalue of neighboring Z stabilizers, a phase flip will result in a change in the eigenvalue of neighboring X stabilizers. Standard gate circuits including the H-gate and CNOT gates, for measuring the X- and Z-stabilizer eigenstates are shown in FIG. 2. The horizontal lines represent qubit states as a function of time. The |0> represents the initialization of a qubit in zero state (in this case an ancillary qubit), the boxed H represent a Hadamard gate. A vertical line connecting qubits with a closed dot on one side and an open dot with cross on the other side represents a conditional NOT gate (CNOT). As an example, the top left figure in FIG. 2 represents an ancillary X-qubit which is initialized in zero. Then a Hadamard gate is performed on the ancillary qubit. Then 4 CNOT gates are performed between the ancillary qubit and its nearest neighbor data qubits. Then a Hadamard gate is performed on the ancillary qubit. Finally, the state of the ancillary qubit is measured to extract the error syndrome.

The CNOT gates in the gate circuits shown in FIG. 2 need to be executed between ancillary qubits (X or Z) and their four nearest neighboring data qubits. These nearest neighbor data qubits are referred to as $D_{NE}$, $D_{NW}$, $D_{SE}$ and $D_{SW}$, where the subscripts refer to the relative position of that data qubit to the ancillary qubit (NE=North-East, NW=North-West, SE=South-East, SW=South-West). A full QEC cycle includes measurement of both the X-stabilizers and Z-stabilizers. The two gate circuits on the left side of FIG. 2 show that four data qubits in the unit cell are provided on a grid in top right (NE), top left (NW), bottom right (SE) and bottom left (SW) positions; and said subsequent couplings are carried out in NE, NW, SE, SW order (S-order) so that one is allowed order to measure the X- and Z-stabilizers, referred to as the "S"-shape order, respectively measuring stabilizers in the order: NE-NW-SE-SW.

The two gate circuits on the right side of FIG. 2 show that four data qubits in the unit cell are provided on a grid in top right (NE), top left (NW), bottom right (SE) and bottom left (SW) positions; and said subsequent couplings are carried out in NW, NE, SW, SE (Z-order), i.e. another allowed order, known as the "Z"-shape order, respectively measuring stabilizers in the order: NW-NE-SW-SE.

Other orders (e.g. clockwise or counterclockwise measurements) are not allowed because they do not preserve the commutation relationships with nearby stabilizers. It is allowed to use the same order (either "S"-shape order or "Z"-shaper order) for both the X-stabilizers and the Z-stabilizers, but it is also allowed to use an order for one type of stabilizers different from the order of the other type of stabilizers.

In the surface code e.g. as disclosed in Fowler each of the four CNOT gates for the X-stabilizers is carried out simultaneously for all X-stabilizers of the complete surface in order to preserve commutation relationships with neighboring stabilizers. Thus, for example single qubit hadamard gates are executed on all or part of said data qubits or ancillary qubits and measurements are performed on the ancillary qubits Z simultaneously and measurements are performed on the ancillary qubits X simultaneously, the total combination of single qubit gates, CZ gates and measurements yielding the eigen states of the stabilizers of the of the qubit substrate. Simultaneously here means that the first CNOT gate must be executed for all X-stabilizers of the complete surface, before the second CNOT of that QEC cycle is executed, and so on for the third CNOT and the fourth CNOT. Likewise, each of the four CNOT gates for the Z-stabilizers has to be done simultaneously for all Z-stabilizers of the complete surface in order to preserve commutation relationships with neighboring stabilizers. The overall gate circuit for all stabilizer measurements will then be one big gate circuit (not separate circuits for each stabilizer), because each data qubit will in general take part in the stabilizer gate circuit of 4 neighboring ancillary qubits (except at the boundaries of the surface).

The stabilizer gate circuits do not necessarily require CNOT gates when implemented. They can be implemented using any of the universal entangling two-qubit gates, such as controlled-NOT (CNOT) or controlled-Phase (CZ). The optimum choice of gate depends on the type of qubit, ease of implementation of the gate, gate duration and accuracy, etc. The embodiments described here are implemented using CZ gates for carrying out a QEC cycle, because of the special way the CZ gates can be implemented (described further on). FIG. 3 shows the equivalent stabilizer circuits for FIG. 2, but now expressed in CZ gates. The vertical lines with closed circles on both sides represent a CZ gate between two-qubits. Note that this gate circuit also requires Hadamard gates to be performed on the data qubits, a fact that follows simply from the conversion from CNOT gates to CZ gates.

Circuit Quantum ElectroDynamics (cQED) architectures implementing a plurality of superconducting qubits connected by a plurality of resonators to mediate 2-qubit gates such as CZ gates are known per se. In many cQED architectures, Josephson-junctions play a key role in providing the non-linearity that is needed to create a qubit. Generally, it is very useful to have the ability to tune the qubit, which is done by creating a split Josephson-junction, also known as a SQUID. As an example, US2009/0015317, describes a superconducting Josephson-junction-based qubit. Josephson-junction qubits are operated at temperatures near absolute 0K (typically 5 to 100 mk). The split Josephson-junctions create a superconducting loop in the circuit. This superconducting loop acts as a non-linear inductance in the circuit. Together with the capacitor it acts as a quantum mechanical non-harmonic oscillator at mK-temperature. The anharmonicity of this oscillator (or resonant RF circuit) results in energy levels of the quantum states that are not spaced at equal distances from each other. This enables using two energy levels, e.g. the |0> state (ground state) and |1> state (first excited state), to be used as computational qubit states. The inductance can be tuned in-situ by applying an external magnetic field, as shown in FIG. 14A. This way the resonance frequency of the circuit (the qubit) can be tuned.

Today's quantum computers or quantum chips have room temperature control systems for generating the control signals to perform qubit operations (qubit gates) and use electrical wiring going from the room temperature control systems to the qubit chip at a temperature close to absolute zero. In current systems, the number of qubits in a quantum chip is limited (up to 20 qubits), therefore the number of electrical wires between the control system and the chip is limited. However, even at this small number of qubits, the heat load resulting from this connection between room temperature and the chip operating temperature is takes up a large part of the available cooling power that manages the operating temperature of the chip. Reduction of the number of control lines is therefore crucial.

Currently, no solution is known to perform the QEC cycle with cQED qubits for surface codes consisting of large numbers of qubits, because of the requirement for simultaneous execution of the 4 CNOT gates (or equivalent entangling gates, such as the CZ) over the full surface. As a specific example: For Josephson-junction qubits a dynamically tuned CZ gate is highly favorable to use as an entangling gate in the QEC cycles, because of its relative ease of implementation, short gate duration and high fidelity. However, the required shift in energy levels to realize the gate will in general result in unwanted interactions with other energy levels of neighboring qubits in the multi-qubit system. This unwanted interaction will result in unwanted changes of the required quantum state of the ancillary and data qubits thereby failing to execute the QEC cycle correctly.

It is useful to first describe how the CZ gate is implemented with flux tuneable Josephson-junction qubits. A detailed description of this method is given e.g. in [F. W. Strauch, P. R. Johnson, A. J. Dragt, C. J. Lobb. J. R. Anderson and F. C. Wellstood, Phys. Rev. Lett 91, 167005 (2003)]. An implementation of this gate has been demonstrated [by L. DiCarlo, J. M. Chow, J. M. Gambetta, L. S. Bishop, D. I. Schuster, J. Majer, A. Blais, L. Frunzio, S. M. Girvin and R. J. Schoelkopf, Nature 460, 240 (2009)]. FIG. 15 bottom shows the spectrum of single excitations for a two-qubit system. The horizontal axis is a measure for the flux control signal responsible for the detuning of the qubit frequency. This can be, for example, the output voltage of controllable voltage supply that is coupled to the flux control loop generating the local magnetic flux that is coupled into the qubit. FIG. 15 top shows the two-excitation spectrum. This gate uses the avoided crossing between the |11> state and non-computational |02> state to generate a ZZ-interaction. By pulse-tuning one of the two-qubits close to this avoided crossing (indicated by the Roman numeral II on the horizontal axis), keeping the detuned qubit at the interaction frequency for a specific amount of time and tuning the qubit away from this interaction frequency, the ZZ interaction generates the required CZ gate. FIG. 15 further shows an example of a typical pulse profile for generating the CZ gate. Generally a calibration is required to determine the optimum pulse shape. A typical duration of the flux pulse may, for example, be between 2 and 100 ns.

For a multi-qubit system, where for neighboring qubits non-participating ones are directly coupled to participating qubits, unwanted interactions with non-participating qubits should be avoided. Currently there exist no known methods (not even theoretical ones) that completely avoid unwanted interactions with other energy levels resulting from the interaction with non-participating qubits. To explain the concept of participating and non-participating qubits, FIG. 4, FIG. 5 and FIG. 6 are used. There exist several ways to directly couple qubits in a 2D surface code layout. FIG. 6 shows one of such methods, where a resonator is used to couple 4 neighboring qubits. The resonator can be used to drive single-qubit gates on all of the 4 qubits, by using frequency separation between the qubits. When only one resonator is used for 4 qubits, the number of drive lines (that have to come from room temperature to the operating temperature of the qubits, typically between 10 mK and 100 mK) is just one per every four qubits. This reduces the overall heat load to the qubits (compared to one drive line per qubit). The figure shows an intended 2-qubit gate between two-qubits (encircled by an ellipse). Due to the resonator couplings, there are 8 non-participating qubits (grey squares) directly coupled to this 2-qubit system, resulting in a 10-qubit system (2 participating qubits and 8 non-participating qubits). In this case there exists a method to place and tune the resonance frequencies of these 8 qubits in such a way that interaction with the 2 participating qubits is avoided. This can be done by detuning the non-participating qubits to frequencies far away from the ZZ interaction frequency of the D-CZ gate. However, at the same, the qubits that are not-participating in the D-CZ gate formed in the ellipse may be participants in another interaction with other qubits when no specific measure is taken. This means that qubits non-participating in this second interaction will also have to be detuned and even further away for a next set of neighboring qubits and so on and so on. No solution is known to avoid this when each resonator is coupled to 4 qubits: neighboring qubits have to be de-tuned farther and farther away. Therefore, this method would require a linearly increasing number of unique design frequencies for the qubits when the number of qubits is increased, which is not physically possible and not scalable. Also this requires an increasing number of unique flux sequences to tune all of the qubits which is very impractical. Another issue with this connectivity is that unwanted interactions cannot be avoided when qubits are detuned to the interaction frequencies with other qubits. This is because of the fact that during one part of the QEC cycle, some qubits need to be detuned downwards in frequency and others need to be moved upwards, while later during the QEC cycle they need to interact which always results in unwanted interactions with qubits that are located at a frequency in between.

FIG. 5 shows another method to couple the qubits to each other. In this case 1 resonator is used for every 3 qubits. As shown in the figure, also in this situation there are 8 non-participating qubits with which unwanted interactions cannot be avoided for large number of qubits.

One part of the present invention is the realization that the number of non-participating qubits is only 6 when only nearest neighbor (resonator) couplings are used, as shown in FIG. 4. Such a connectivity is not unique to the present invention, however it is a requirement for the present invention and therefore part of the overall solution.

Solutions are known to perform single-qubit gates (Hadamard gates) in the QEC cycle for a large number of qubits. The single-qubit gates can be executed in parallel for a large number of qubits, for example as described in US2009/0015317. The present invention includes a control system, known per se, to perform single-qubit gates, such as Hadamard gates, synchronized with the two-qubit gates.

In some papers discussing the QEC cycle it is assumed that the entangling gates for the X-stabilizers and for the Z-stabilizers are done simultaneously. To be more specific, in these theoretical implementations, the first entangling gate for the X-stabilizers is done simultaneously with the first entangling gate for the Z-stabilizers, also for the second, third and fourth entangling gates. Then, measurement of the X-ancillary qubits and Z-ancillary qubits are also performed simultaneously. This parallelization is a logical approach because it minimizes the amount of consecutive gates that needs to be done, thereby minimizing the total duration of a QEC cycle. However, no practical cQED device yet exists to perform the QEC cycle in such a way, without scaling in complexity and in number of supporting control systems (arbitrary wave generators, electrical wiring etc.) when the number of qubits in the device increases. Increase of the electrical wiring with increasing number of qubits will result in an unmanageable heat load to the cooling system. Continuous increase of the number of control signals will lead to an increase of cost and a complexity of the control systems that will quickly be unmanageable. No combination of qubit device and control architecture is currently available to execute the QEC cycle in the surface code which is required for large scale quantum computation.

SUMMARY

It is aimed to avoid interactions with non-participating qubits during two-qubit gates in a way that is scalable for any number of qubits. To this end, the following is proposed:

A quantum computer provided with a substrate of qubits arranged in repeated unit cells, wherein data qubits (D1, D2, D3, D4) are coupled to respective X- and Z-ancillary qubits (X1, X2, Z1, Z2), the X-ancillary qubits capable of measuring a first quantum variable and the Z-ancillary qubits capable of measuring a second quantum variable of said data qubits by a nearest neighbor interaction provided only between said data qubits and said ancillary qubits, wherein said nearest neighbor interaction is provided by detuning a transition frequency of any of the data qubits and ancillary qubits into a coupling frequency for providing a coherent 2-qubit gate, wherein a plurality of data qubits are provided on a first grid, wherein a unit cell comprises four data qubits (D1, D2, D3 and D4); a plurality of X- and Z-ancillary qubits (X1, X2, Z1, Z2) are provided on a second grid, said second grid shifted relative to the first grid, so that one of the ancillary qubits is central to the four data qubits (D1, D2, D3, D4) of the unit cell and the X- and Z-ancillary qubits (X1, X2, Z1, Z2) are each further arranged in respective diametral positions relative to one of the data qubits (D1, D2, D3, D4) of the unit cell, said unit cell thereby further comprising two X-ancillary qubits (X1, X2) and two Z-ancillary qubits (Z1, Z2); wherein each one of the data qubits (D1, D2, D3, D4) is arranged to be subsequently brought in a coupling resonance with any of the X- and Z-ancillary qubits by simultaneous coupling of first ones (X1, X2 or Z1, Z2) of the ancillary qubits (X1, X2, Z1, Z2) with a respective neighboring data qubit; and subsequent couplings of said first ones with the other neighboring data qubits; followed by simultaneous coupling of second ones (Z1, Z2 or X1, X2) of the ancillary qubits with a neighboring data qubit; and subsequent couplings of said second ancillary qubit with the other neighboring data qubits.

In another aspect, the following is proposed:

A method for executing a quantum error correction cycle in a quantum computer provided with a substrate of qubits arranged in repeated unit cells, wherein data qubits are coupled to respective X- and Z-ancillary qubits, the X-ancillary qubits capable of measuring a first quantum variable and the Z-ancillary qubits capable of measuring a second quantum variable of said data qubits by a nearest neighbor interaction provided only between said data qubits and said ancillary qubits, wherein said nearest neighbor interaction is provided by detuning a transition frequency of any of the data qubits and ancillary qubits into a coupling frequency for providing a coherent 2-qubit gate, wherein said method comprises the steps of:

providing a plurality of data qubits on a first grid, wherein a unit cell comprises four data qubits;

providing a plurality of X- and Z-ancillary qubits on a second grid, said second grid shifted relative to the first grid, so that one of the ancillary qubits is central to the four data qubits of the unit cell and the X- and Z-ancillary qubits are each further arranged in respective diametral positions relative to one of the data qubits of the unit cell, said unit cell thereby further comprising two X-ancillary qubits and two Z-ancillary qubits;

wherein each one of the data qubits is subsequently brought in a coupling resonance with any of the X- and Z-ancillary qubits by simultaneous coupling of first ones of the ancillary qubits (X1, X2, Z1, Z2) with a respective neighboring data qubit; and subsequent couplings of said first ones with the other neighboring data qubits; followed by simultaneous coupling of second ones of the ancillary qubits with a neighboring data qubit; and subsequent couplings of said second ancillary qubit with the other neighboring data qubits.

By arranging the qubits and stabilizers in the prescribed order of the unit cell as here above indicated, a specific order of quantum gates and quantum measurements can be carried out simultaneously for all unit cells to perform stabilizer measurements in the so-called surface code. For this arrangement, qubits can be designed at a limited set of specific frequencies and the qubits laid out in unit cells that the pattern of design frequencies can be repeated over the full surface by small unit cells. Furthermore the qubits can be coupled in a way that avoids other interactions with non-participating qubits during two-qubit gates. Qubit measurements and qubit gates can be pipelined to minimize the overall cycle time of a quantum error correction cycle. In an embodiment a conditional phase gate is provided as an entangling gate in the QEC cycle.

The qubits will be manufactured in a surface in rows with alternating resonance frequencies (high, medium, low, medium, high, medium, low . . . ). Following the proposed method to bring each one of the data qubits (D1, D2, D3, D4) of the unit cell subsequently in a coupling resonance with the first ones of the ancillary qubits (X1, X2 or Z1, Z2) and then in a coupling resonance with the second ones of the ancillary qubits (Z1, Z2 or X1, X2) it follows that this can be achieved with a limited number of detuning pulses, which can be spatially multiplexed. For the unit cell arrangement as currently defined, only 8 unique detuning sequences are needed (one for each of the qubits D1, D2, D3, D4, X1, X2, Z1, Z2) so the control system only needs to generate these 8 unique detuning sequences. Then, a de-multiplexer is used to fan out these signals into multiple copies which are sent to the qubit plane. The control system thus physically has 8 unique detuning sequences, which are translated into abstract unit cells at the qubit plane.

While it is known from Fowler that each one of the data qubits (D1, D2, D3, D4) can be arranged to be subsequently brought in a coupling resonance with any of the X- and Z-ancillary qubits by simultaneous coupling of all ancillary qubits (X1, X2, Z1, Z2) with a respective neighboring data qubit, Fowler does not describe a unit cell construct that allows the data qubits to be coupled to the first ones of the ancillary qubits (X1, X2 or Z1, Z2) before and to the second ones of the ancillary qubits (Z1, Z2 or X1, X2) thereafter. Further advantages of the present invention include a flux control scheme that is compatible with logical operations (both single- and two-qubit) for both planar- and defect-type logical qubits; and a flux control scheme that optimizes use of coherence sweet-spots.

DESCRIPTION OF EXEMPLARY EMBODIMENTS

Hereinafter, exemplary embodiments of the present invention will be described with reference to the accompanying drawings.

Unless otherwise defined, all terms (including technical and scientific terms) used herein have the same meaning as commonly understood by one of ordinary skill in the art to which this disclosure belongs as read in the context of the description and drawings. It will be further understood that terms, such as those defined in commonly used dictionaries, should be interpreted as having a meaning that is consistent with their meaning in the context of the relevant art and will not be interpreted in an idealized or overly formal sense unless expressly so defined herein. In some instances, detailed descriptions of well-known devices and methods may be omitted so as not to obscure the description of the present systems and methods. Terminology used for describing particular embodiments is not intended to be limiting of the invention. As used herein, the singular forms "a", "an" and "the" are intended to include the plural forms as well, unless the context clearly indicates otherwise. The term "and/or" includes any and all combinations of one or more of the associated listed items. It will be further understood that the terms "comprises" and/or "comprising" specify the presence of stated features but do not preclude the presence or addition of one or more other features. All publications, patent applications, patents, and other references mentioned herein are incorporated by reference in their entirety. In case of conflict, the present specification, including definitions, will control.

The term "circuit" is used in a conventional way to signify any structural hardware or software arrangement having a capability of executing program logic in order to provide a certain basic function. A skilled person is typically aware of how to operate or implement a circuit in the context of the description, with processor elements elucidated here below. The term "program logic" is used in a conventional way to signify the operating instructions, which may be embodied in hard- or software structures, that control a circuit to the designated functional behavior.

The term "signal line" is used in a conventional way to signify an information exchanged, which may be in the form of coded signals, in analog or digital fashion by any conventional communication device, where it is not excluded that other signal lines are available, but merely to signify that a certain connectivity is available. This may also indicate indirect connectivity, that is, a signal line may be provided by indirect signaling, for example, via another functional device.

Figure 14A:
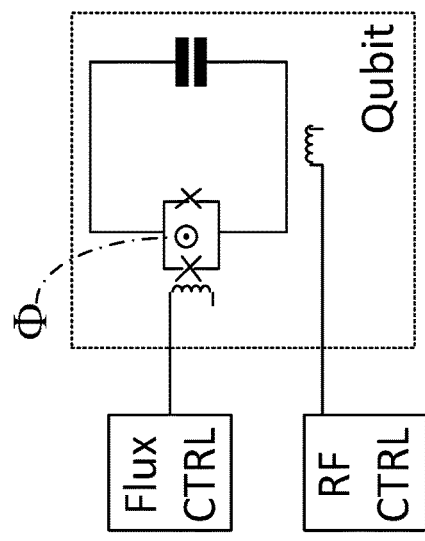
FIG. 14A illustrates a split-Josephson-junction qubit with flux control to perform CZ gates and RF control to perform single-qubit gates.

While example embodiments are shown for systems and methods, also alternative ways may be envisaged by those skilled in the art having the benefit of the present disclosure for achieving a similar function and result. E.g. some components may be combined or split up into one or more alternative components. Finally, these embodiments are intended to be merely illustrative of the present system and should not be construed as limiting the appended claims to any particular embodiment or group of embodiments. Thus, while the present system has been described in particular detail with reference to specific exemplary embodiments thereof, it should also be appreciated that numerous modifications and alternative embodiments may be devised by those having ordinary skill in the art without departing from the scope of the present systems and methods as set forth in the claims that follow. The specification and drawings are accordingly to be regarded in an illustrative manner and are not intended to limit the scope of the appended claims. FIG. 14A illustrates a split-Josephson-junction tuneable qubit. It comprises two Josephson-junctions and a capacitor forming a resonant circuit. The qubit is coupled, for example by inductive or capacitive coupling, to a system generating and controlling microwave pulse (RF CTRL) via a signal line. The qubit is also coupled, for example by inductive coupling, to a system generating and controlling DC signals or pulses (Flux CTRL) via a signal line. Accordingly in this example detuning is provided by varying a magnetic flux in the oscillator circuit. More specifically, X- and Z-ancillary qubits are provided with a magnetic flux control line, that is operated in multiplexed way for controlling the flux for detuning any of the first, second and third frequencies The inductive coupling generates an external magnetic field that is coupled into the superconducting loop, resulting in a tuneable qubit frequency. The resonant circuit may have transition frequencies between 1 and 10 GHz, for example. Accordingly, in the embodiment the data qubits and ancillary qubits comprises an oscillator circuit including a split Josephson-junction. However, method may be applied independent of the physical quantum oscillator, and could be also an oscillating quantum variable of many forms. For example, the Josephson-junction qubit can be operated in charge mode or operated in phase mode.

The RF CTRL loop generates, for example, short pulses of frequencies resonant or non-resonant with the qubit transition frequencies in order to perform single-qubit gates. The pulses may be high frequency RF signals modulated by a square envelope, a Gaussian envelope or other envelope, suitable to perform single-qubit rotations.

Figure 15:
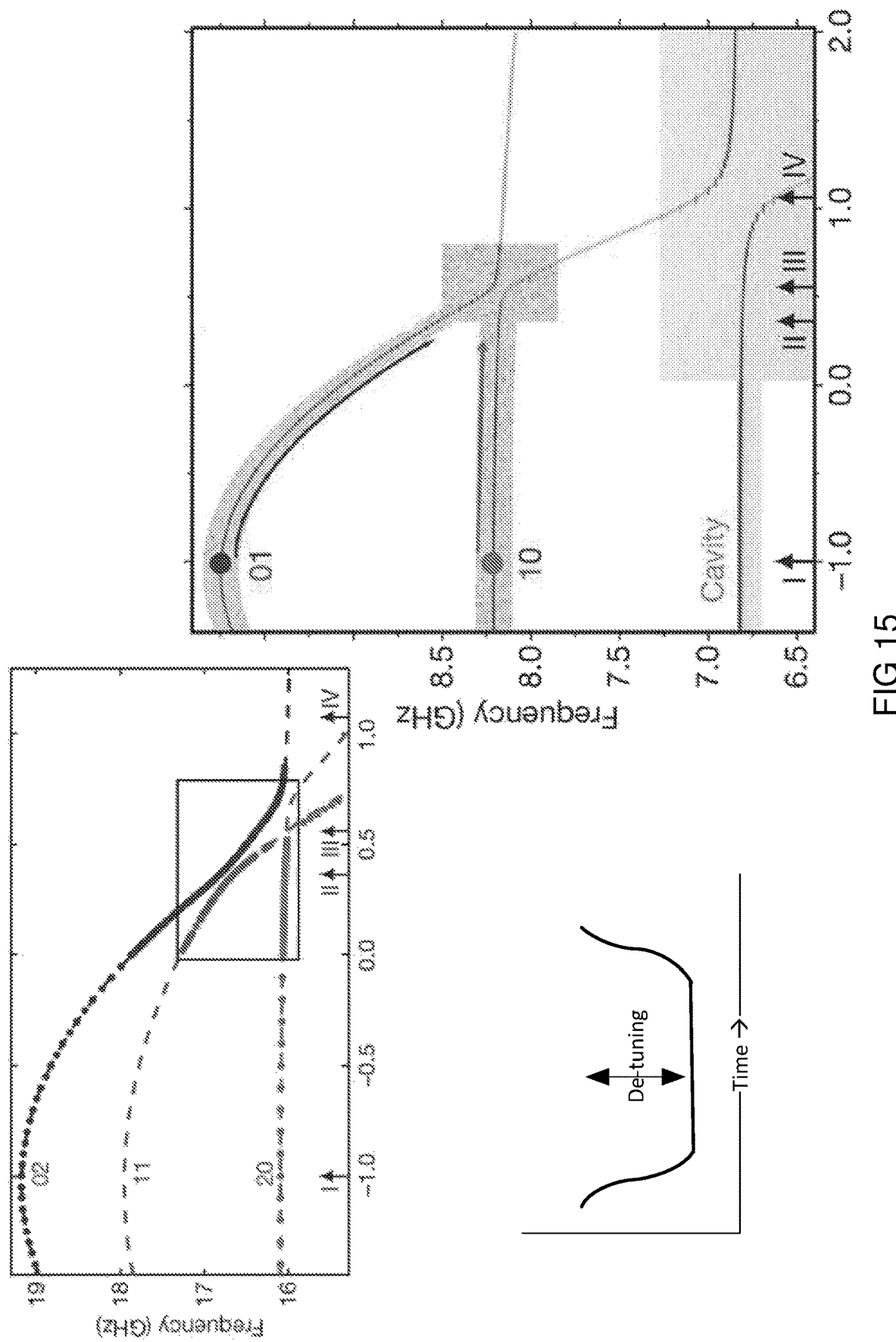
FIG. 15 bottom picture illustrates the detuning of a qubit (first energy level of the 2-qubit system denoted by 01) to point II, where a two-qubit ZZ interaction occurs due to the avoided crossing (shown in top figure) between energy levels |02> and |11>, from [L. DiCarlo, J. M. Chow, J. M. Gambetta, L. S. Bishop, D. I. Schuster, J. Majer, A. Blais, L. Frunzio, S. M. Girvin and R. J. Schoelkopf, Nature 460, 240 (2009)].

The flux CTRL loop generates an external magnetic field that is coupled with the qubit, to tune the qubit transition frequency. The tuning of the transition frequency is the basis for performing the CZ gate between two coupled qubits. By using short-circuited transmission lines with a bandwidth from DC to 5 GHz, for example, the transition frequency of the qubit can be tuned by many GHz using the Flux control system. FIG. 15 illustrates the profile of a flux pulse to tune the transition frequency of a qubit to the interaction frequency (the interaction frequency denoted by the Roman numeral II in FIG. 15 bottom).

The exact shape of the flux pulses may be determined by modelling or calibration. In an exemplary embodiment of the present invention the flux pulses may have duration between 10 and 100 ns. The rise and fall time of the flux pulses is typically in the order of 1 to 10 ns.

In an exemplary embodiment the flux pulse can be generated, for example, by sending a rectangular voltage or current pulse through a Gaussian filter. The rectangular pulse can be generated by a wave generator. In an alternative embodiment, voltage or current pulses can also be generated directly by an Arbitrary Waveform Generator.

The invention includes one or multiple signal sources, such as Arbitrary Waveform Generators, to generate the required voltage or current pulses for detuning of the transition frequencies of the 8 qubits in one unit cell.

The invention is not limited to Josephson-junction qubits but may also be embodied in other types of qubits, where the CZ gate is realized by exploiting avoided crossings with non-computational levels and where the frequencies can be tuned in and out of resonance with the computational levels.

Figure 14B:
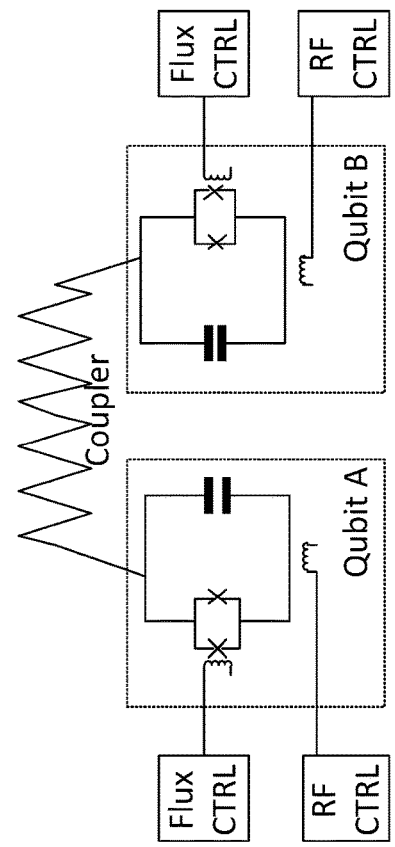
FIG. 14B illustrates two split-Josephson-junction qubits (A and B) coupled by a physical coupler.

In an exemplary embodiment of the present invention, pairs of qubits will be coupled by a physical coupler, according to FIG. 14B. This coupler can be, for example, a coplanar waveguide cavity resonator enabling the exchange of photons between the qubits. It can also be a direct coupling between the qubits, such as capacitive coupling. The method requires couplings between nearest neighbor qubits only.

Figure 1:
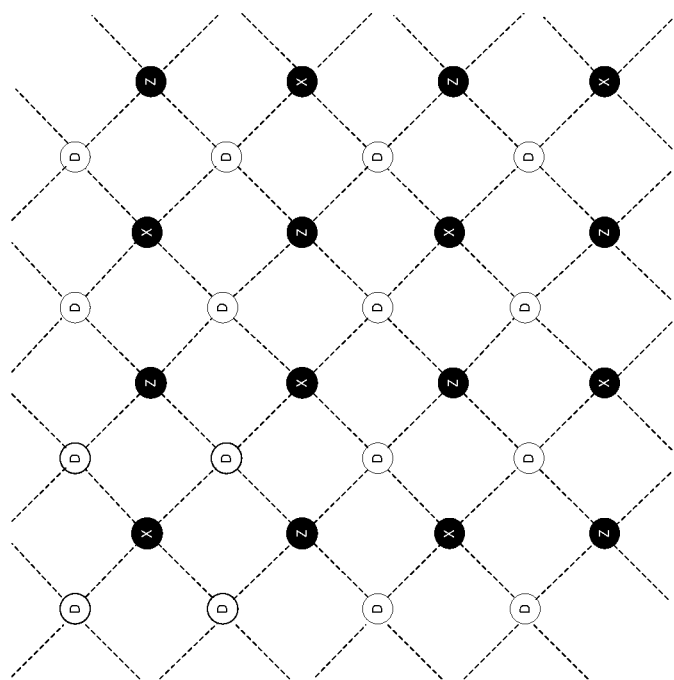
FIG. 1 illustrates the surface code layout of qubits
Figure 2:
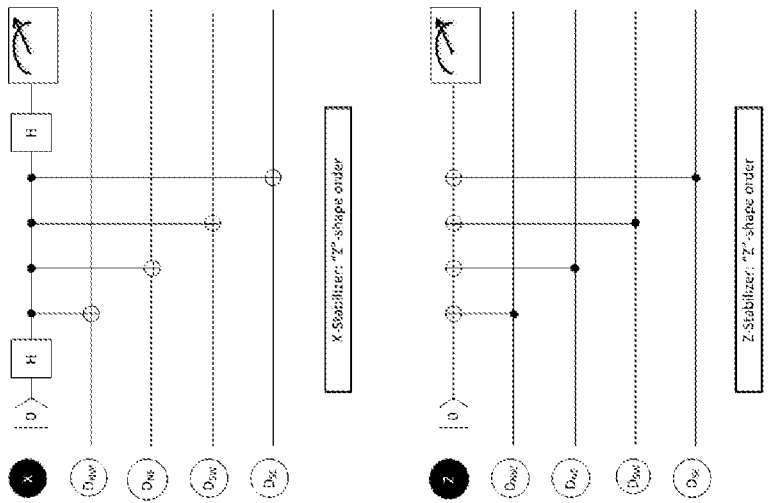
FIG. 2 shows standard circuits to measure the surface code X-stabilizers and Z-stabilizers ("S-shape order on the left, "Z"-shaped order on the right) using CNOT gates as two-qubit entangling gates.
Figure 2:
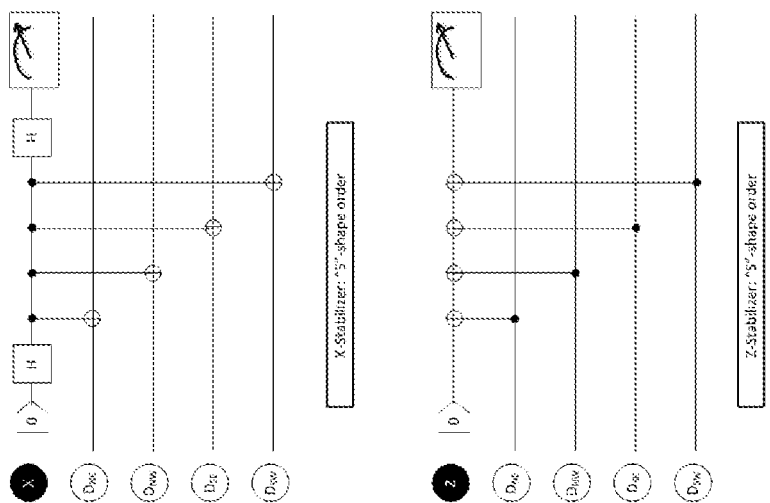
Figure 3:
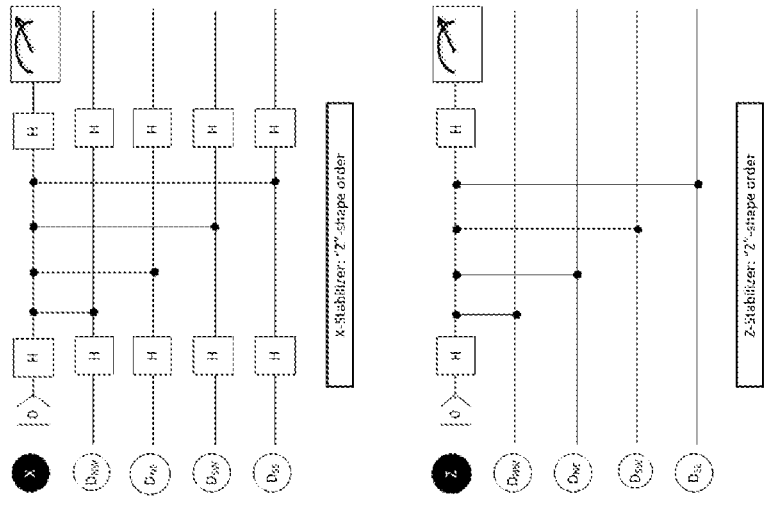
FIG. 3 shows standard circuits to measure the surface code X-stabilizers and Z-stabilizers ("S-shape order on the left, "Z"-shaped order on the right) using CPHASE gates as two-qubit entangling gates.
Figure 3:
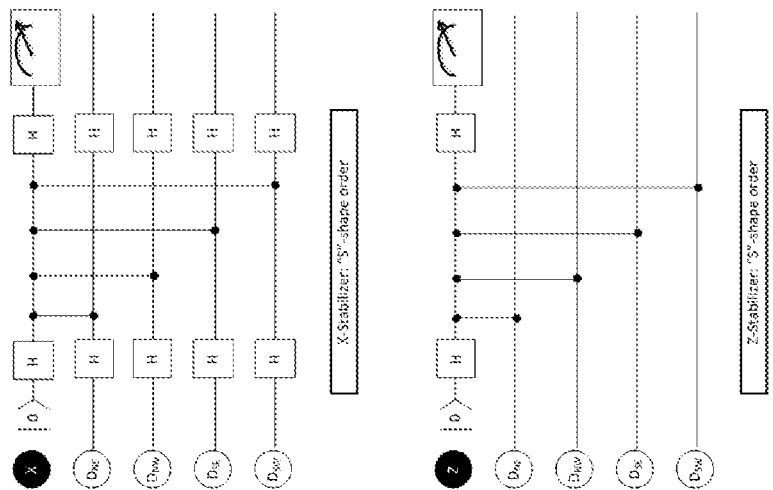
Figure 4:
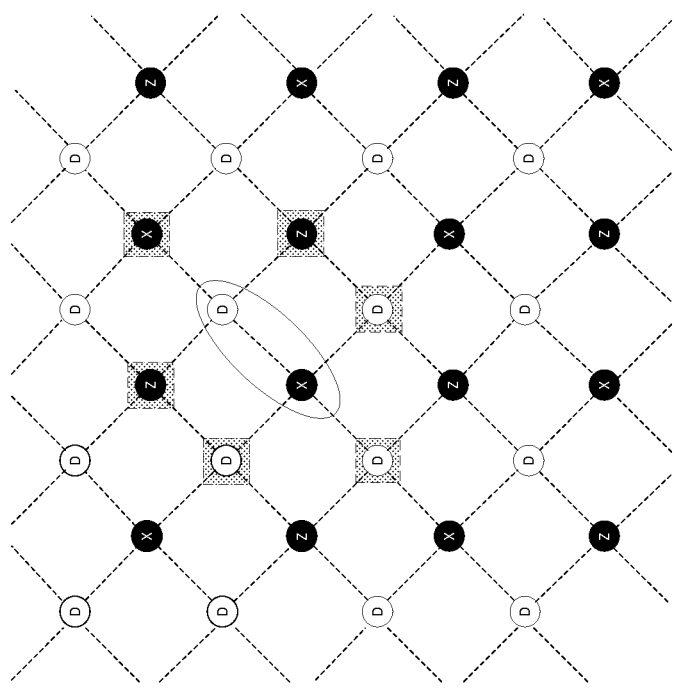
FIG. 4 shows the participating and non-participating qubits that are directly coupled to a pair of qubits involved in an entangling gate in the stabilizer measurement circuits when only nearest neighbor couplings are present between the qubits in the surface code.
Figure 5:
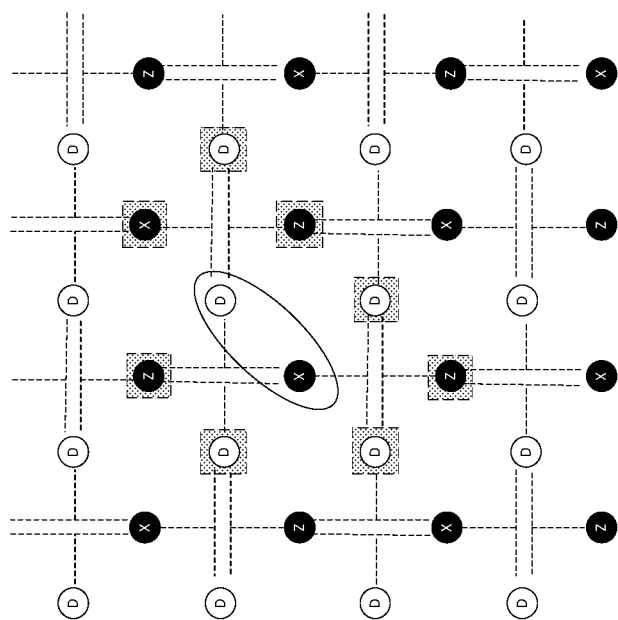
FIG. 5 shows the participating and non-participating qubits that are directly coupled to a pair of qubits involved in an entangling gate in the stabilizer measurement circuits when a physical coupler is used between 3 (nearby) qubits.
Figure 6:
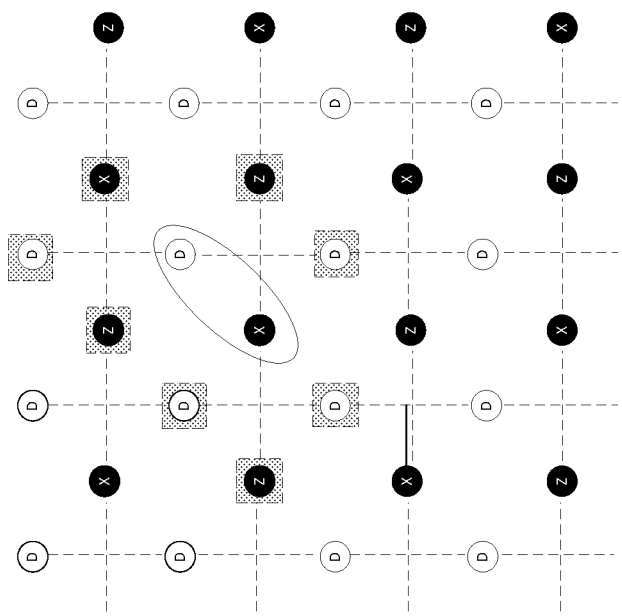
FIG. 6 shows the participating and non-participating qubits that are directly coupled to a pair of qubits involved in an entangling gate in the stabilizer measurement circuits when a physical coupler is used between 4 (nearby) qubits.

In an exemplary embodiment of the present invention, the quantum chip will contain a plurality of qubits, coupled to each other with a physical coupler, according to FIG. 4. In FIG. 4 the dashed lines represent a physical coupler between two neighboring qubits. Each data qubit will be coupled to its 4 nearest ancillary qubits, using 4 individual couplers. Likewise, each ancillary qubit will then automatically be coupled to its 4 nearest data qubits with 4 individual couplers.

Figure 7:
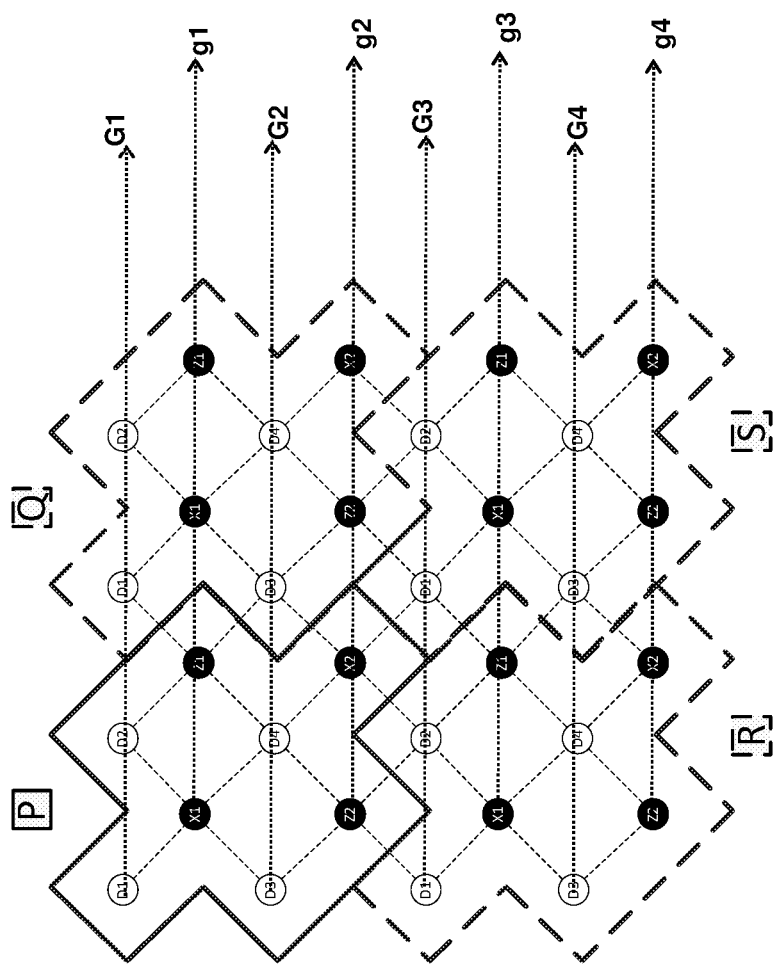
FIG. 7 shows the definition of an 8-qubit unit cell (P) with 8 distinct qubits, numbered D1, D2, D3, D4, X1, X2, Z1 and Z2, according to an exemplary embodiment of the present invention. The unit cell can be repeated over a larger surface. The unit cells Q, R and S are an example of such a repetition.

In an exemplary embodiment of the present invention, the qubits laid out according to FIG. 4, are grouped in unit cells and labelled according to FIG. 7. In FIG. 7, the thick line around 8 qubits (D1, D2, D3, D4, X1, X2, Z1, Z2) defines one unit cell, the unit cell here labelled P for convenience. Unit cells Q, R and S illustrate the repetition of the unit cells across all qubits on the chip. Accordingly a plurality of data qubits are provided forming a first grid of rows G1, G2, G3, G4 of dataqubits D. A unit cell P, Q, R, S comprises four data qubits (D1, D2, D3 and D4). A plurality of X- and Z-ancillary qubits (X1, X2, Z1, Z2) is provided forming a second grid g1, g2, g3, g4 shifted relative to the first grid, so that one of the ancillary qubits is central to the four data qubits (D1, D2, D3, D4) of the unit cell. The X- and Z-ancillary qubits (X1, X2, Z1, Z2) are arranged in respective diametral positions relative to one of the data qubits (D1, D2, D3, D4) of the unit cell. The unit cell P, Q, R, S, thereby, additional to four data qubits, further comprising two X-ancillary qubits (X1, X2) and two Z-ancillary qubits (Z1, Z2).

In an exemplary embodiment of the present invention, qubits with identical labels in different unit cells will be nominally identical with respect to the first quantum state transition frequency and with respect to anharmonicity. Typical values for the first quantum state transition frequency are between 1 and 20 GHz. Typical values for the anharmonicity are between −200 and −500 MHz. (Note: as pointed out for example in [L. DiCarlo, J. M. Chow, J. M. Gambetta, L. S. Bishop, D. I. Schuster, J. Majer, A. Blais, L. Frunzio, S. M. Girvin and R. J. Schoelkopf, Nature 460, 240 (2009)], the negative anharmonicity permits the phase gate at point II to occur before the onset of transverse coupling in FIG. 15 at point III).

Figure 10:
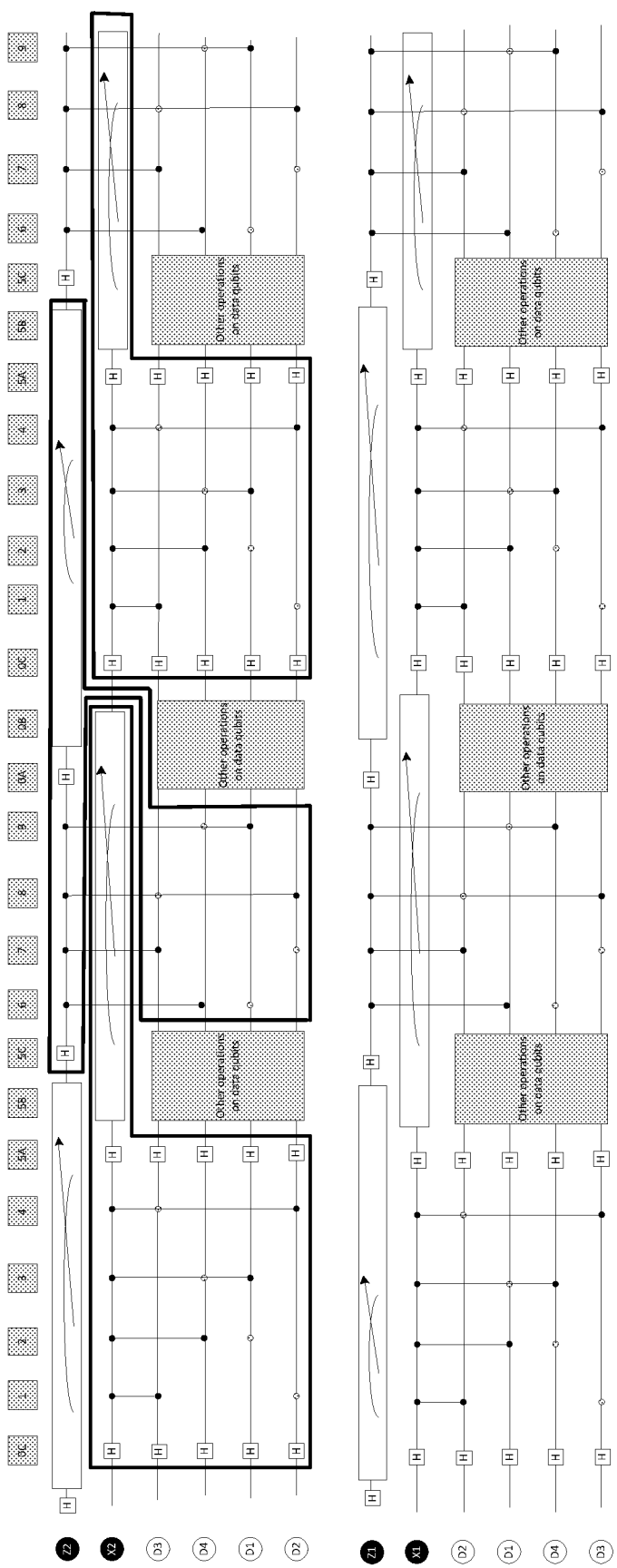
FIG. 10 shows the pipelining/parallelization of measurements on ancillary qubits, single-qubit operations on data qubits and two-qubit entangling gates in order to minimize the duration of the QEC cycle, according to an exemplary embodiment of the present invention.

FIG. 10 shows the QEC cycle, according to one embodiment of the present invention. This figure illustrates one embodiment for the QEC cycle, namely the before-mentioned "S" shape order for both the X-stabilizers and Z-stabilizers. This figure illustrates the circuit for executing the single and two-qubit gates to measure both stabilizers. The numbers 0C, 1, 2 . . . 9 represent times slots for the qubit gates. The qubit labels on the left side of the figure refer to the labelling in the unit cell definition. The top gate circuit shows the execution of the X2-stabilizer measurement and Z2-stabilizer measurement in the "S" shape order, the bottom circuit shows the execution of the X1-stabilizer measurement and Z2-stabilizer measurement in the "S" shape order. In step 0C single-qubit Hadamard gates are performed for the X-stabilizers. In steps 1 through 4, two-qubit CZ gates are performed, denoted by the vertical lines connecting closed black dots. Note that the CZ gates are not necessarily being executed within one unit cell. The participating qubits can be within the same unit-cell or within a neighboring unit cell. By tuning the flux pulses according to an aspect of the invention, CZ gates are implemented. In step 5A single-qubit Hadamard gates are performed for the X-stabilizers. After that a measurement of the X-stabilizers is performed which can take more time slots, equal time slots, or less time slots than the stabilizer Hadamard and CZ gates. This figure shows a measurement taking more times slots than the stabilizer Hadamard and CZ gates. During this measurement of the X-stabilizer ancillary qubits, the same cycle is executed for the Z-stabilizers. Likewise, the Z-stabilizer ancillary qubits are measured in parallel with the execution of the next round of X-stabilizer gates. In between the stabilizer gates, other operations on data qubits can be done, if needed, as indicated in the figure in time slots 5B and 5C. Note that the duration of time slot 5B depends only on the duration of the ancillary qubit measurements. If the ancillary qubit measurement time is very short, one can simply perform these other operations on data qubits, before starting the next cycle.

Note, FIG. 10 only shows the qubit interactions between the ancillary qubits in one unit cell (in this case unit cell P) and its nearest neighbor data qubits, which can be in the same unit cell or other unit cells. The same circuit is valid for all unit cells. When, in FIG. 10, a data qubit is not involved in a CZ gate it may be participating in a CZ gate with an ancillary qubit from another unit cell.

In some cases, depending on the origin and effect of error sources acting on the qubits, the "Z" shape order may be preferable for measurement of either the X-stabilizers or Z-stabilizers or both. In an alternative embodiment of the present invention, the control system is instructed to execute an alternative order of CZ gates. Alternatively, for X stabilizers, the "Z" shape order can be implemented by exchanging D4 with D3 and exchanging D1 with D2 in the first 4 of the 8 CZ gates shown in FIG. 10. Alternatively, for Z stabilizers, the "Z" shape order can be implemented by exchanging D4 with D3 and exchanging D1 with D2 in the final 4 of the 8 CZ gates shown in FIG. 10.

In the next section, it is explained how the measurement scheme to measure the X- and Z-stabilizers, either with the "S shape order or the "Z" shape order, can be implemented. Irrespective of S- or Z shape, each of the data qubits (D1, D2, D3, D4) is subsequently brought in a coupling resonance with any of the X- and Z-ancillary qubits by simultaneous coupling of first ones (X1, X2 or Z1, Z2) of the ancillary qubits (X1, X2, Z1, Z2) with a respective neighboring data qubit; and subsequent couplings of said first ones with the other neighboring data qubits; followed by simultaneous coupling of second ones (Z1, Z2 or X1, X2) of the ancillary qubits with a neighboring data qubit; and subsequent couplings of said second ancillary qubit with the other neighboring data qubits. This can be executed by a single control line for each one of the eight qubits forming the unit cells, so that unit cells can be coupled.

Figure 11A:
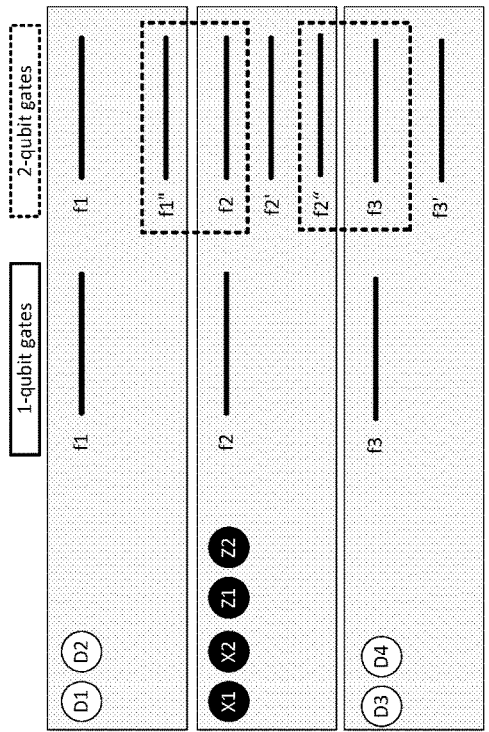
FIG. 11A shows the frequency arrangement for qubits in a unit cell with data qubits on the outer frequencies, according to an exemplary embodiment of the present invention.
Figure 12:
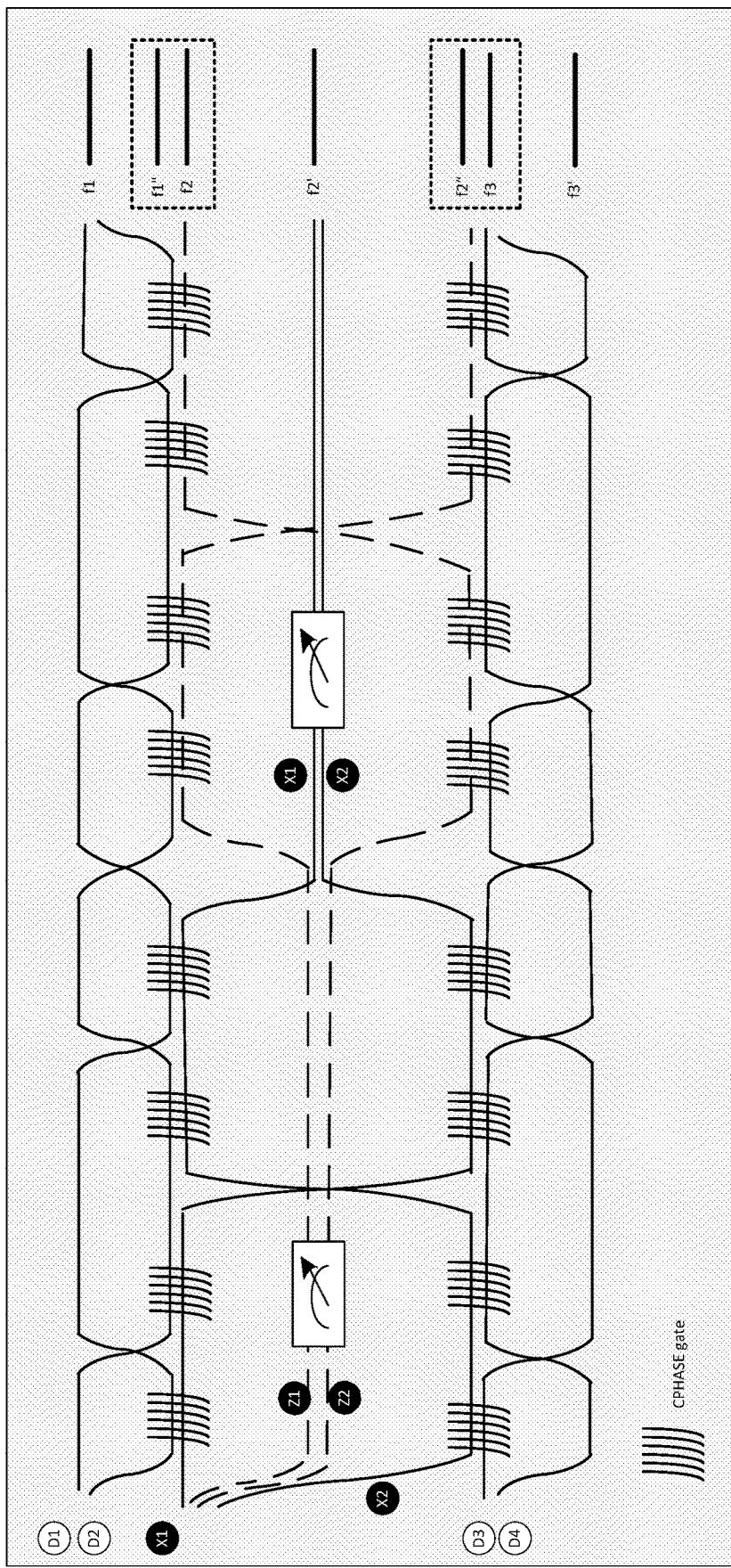
FIG. 12 shows the flux tuning scheme for qubits in a unit cell with data qubits on the outer frequencies, according to an exemplary embodiment of the present invention.

In a preferred embodiment of the present invention, qubit operating frequencies may be arranged according to FIG. 11A and the entangling CZ gates are executed according to the scheme shown in FIG. 12. In FIG. 11A, qubit labels are shown on the left and frequency locations f1, f2, f3, f1", f2', f2" and f3' are shown on the right. It is noted that in this embodiment advantageously, irrespective of the number of unit cells, the grid can be controlled by only seven distinct frequencies. The vertical placement of the frequencies indicates a relative value to each other, e.g. a higher placement indicates a higher frequency, or the opposite: a higher placement indicates a lower frequency. As an example, the value of frequency f2' is in between the frequencies f2 and f2". In this preferred embodiment of the present invention, all data qubits labelled D1 or D2 (in all unit cells), will have first quantum state transition frequencies f1, located at the so-called sweet-spot of the qubits (tuned to their maximum frequencies). The first quantum state transition frequencies of qubits labelled D3 and D4 will be f3 (f3 being the qubit's sweet-spot). The first quantum state transition frequencies of qubits labelled X1 and Z1 will be f2 (f2 being the qubit's sweet-spot. The first quantum state transition frequencies of qubits labelled X2 and Z2 will be f2 (f2 being the qubit sweet-spot). At the sweet-spot frequency of the qubits, the influence of phase noise is minimized thereby maximizing the coherence time of the qubits. At these frequencies f1, f2 and f3 the qubits are tuned far away from the cavity and from each other, thereby minimizing their interaction. Single-qubit gates of the QEC cycles (the Hadamard gates) and potential single-qubit gates in between the stabilizer measurements will take place at the qubit sweet-spot frequencies (f1, f2 and f3).

In this preferred embodiment of the present invention, only seven distinct frequencies are used for the entire grid of qubits. The qubits labelled D1 or D2 will be detuned from frequency f1 to frequency f1" to perform a CZ gate with another qubit (X1, X2, Z1 or Z2) being at frequency f2; Qubits labelled X1, X2, Z1 or Z2 will be detuned from frequency f2 to frequency f2" to perform a CZ gate with another qubit (D3 or D4) being at frequency f3. Qubits labelled X1, X2, Z1 or Z2 will be detuned to frequency f2' (parking frequency) when it has to be detuned from f2 in order to avoid an unwanted interaction with any qubit being detuned to frequency f1". Qubits labelled D3 or D4 will be detuned to frequency f3' (parking frequency) when it has to be detuned from f3 in order to avoid an unwanted interaction with any qubit being detuned to frequency f2". Accordingly first data qubits D1 and D2 are kept operating at a first frequency (f1) and second data qubits D3 and D4 are kept operating at a third frequencies (f3) on said grid in alternating rows. Ancillary qubits are kept operating at a second frequency (f2) between said first and third frequencies. A coupling frequency is provided by detuning any of the first data qubits D1 and D2 in an intermediate frequency (f1") between the first and second frequency. A further coupling frequency is provided by detuning any of the ancillary qubits (X1, X2, Z1, Z2) in an intermediate frequency (f2") between the second and third frequency. The first second and third frequencies at sufficient distance to avoid coupling of the data qubits and ancillary qubits outside the coupling frequency.

In this preferred embodiment, the data qubits will be at their sweet-spot during 4 of the 8 CZ gates executed in the QEC cycle and therefore be less susceptible to phase noise and decoherence. In this preferred embodiment all ancillary qubits will be measured at their parking frequency. Decoherence of the ancillary qubits during measurement is preferred over decoherence of the data qubits, because decoherence during measurement will only lead to a marginal increase of the overall error rate of the system, while decoherence of the data qubits will, generally, lead to a larger increase of the overall error rate of the system.

The values of f1, f2 and f3 will be such that there is no significant ZZ interaction between qubits sharing the same bus resonator. In an exemplary embodiment of the present invention, typical values can be, for example, f1=6.5 GHz, f2=6.0 GHz, f3=5.2 GHz.

The values of f1" and f2" will be such that there is a significant ZZ interaction between qubits sharing the same bus resonator, required for the CZ gate. In an exemplary embodiment of the present invention, typical values can be, for example, f1"=f2+Ec=6.3 GHz and f2"=f3+Ec=5.5 GHz, Ec being the charging energy of the qubit, in this example having a value of 0.3 GHz.

The values of f2' and f3' will be such that there is no significant ZZ interaction between qubits sharing the same bus resonator. In an exemplary embodiment of the present invention, typical values can be, for example, f2'=f2−Ec=5.7 GHz and f3'=f3−Ec=4.9 GHz.

Other values for f1, f2, f3, f1", f2", f2' and f3" may be chosen depending for example on the coupling strength for the ZZ interaction, coupling between qubits at resonance frequencies and qubit-cavity coupling.

Figure 11B:
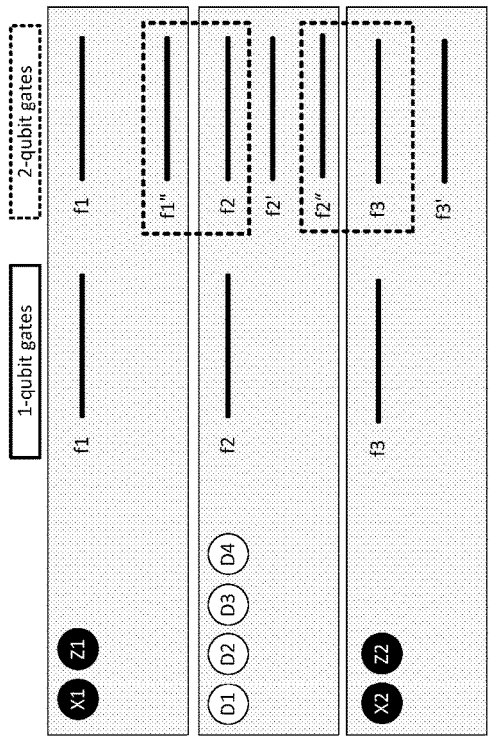
FIG. 11B shows the frequency arrangement for qubits in a unit cell with data qubits on the inner frequencies, according to an exemplary embodiment of the present invention.
Figure 13:
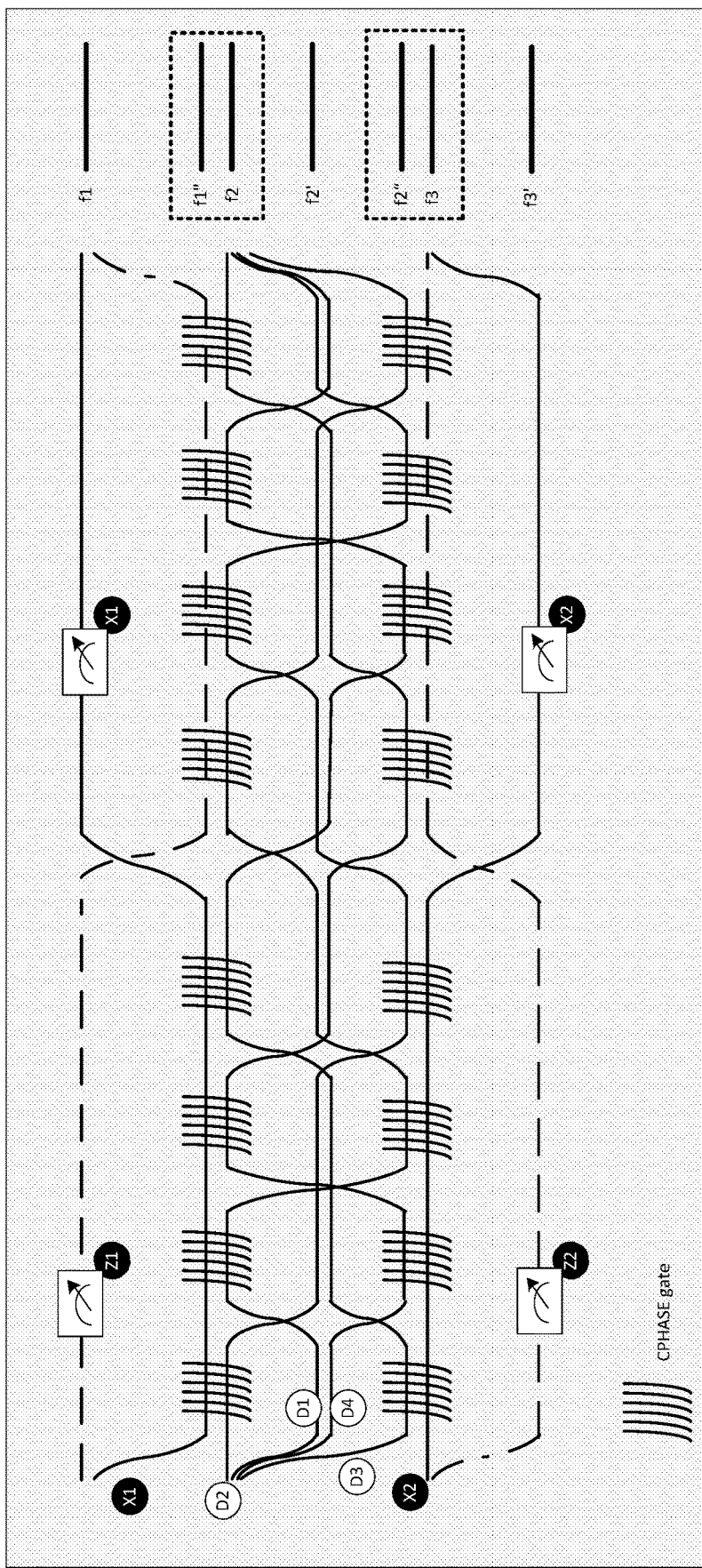
FIG. 13 shows the flux tuning scheme for qubits in a unit cell with data qubits on the outer frequencies, according to an exemplary embodiment of the present invention.

In another embodiment of the present invention, the qubit frequencies are arranged according to FIG. 11B and the entangling CZ gates are executed according to the scheme shown in FIG. 13. In this embodiment the data qubits will be at their sweet-spot during 2 of the 8 CZ gates executed in the QEC cycle. In this embodiment, two of the four ancillary qubits will be measured at their sweet-spot and the other two will be measured at their parking frequency. In an exemplary embodiment of the present invention a control system, as an example a control computer or an FPGA or another control system will control timing and execution of the flux control pulses for each unit cell according to FIG. 12 when the qubit frequency layout is equal to the one shown in FIG. 10. Alternatively, the control system will control timing and execution of the flux control pulses for each unit cell according to FIG. 13 when the qubit frequency layout is equal to the one shown in FIG. 11B. In this example, ancillary qubits X1 and Z1 are kept operating at a first frequency (f1) and ancillary qubits X2 and Z2 are kept operating at a third frequency (f3) in alternating rows on the second grid of ancillary qubits. Data qubits are kept operating at a second frequency (f2) between said first and third frequencies. A coupling frequency is provided by detuning any of the ancillary qubits X1 and Z1 in an intermediate frequency (f1") between the first and second frequency. Another coupling frequency is provided by detuning any of the data qubits (D1, D2, D3, D4) in an intermediate frequency (f2") between the second and third frequency. Similarly first second and third frequencies at sufficient distance to avoid coupling of the data qubits and ancillary qubits outside the coupling frequency. In both cases the X-stabilizers and Z-stabilizers will be measured by performing the 2-qubit gates in the "S" shape order. In some cases, depending on the origin and effect of error sources acting on the qubits, the "Z" shape order may be preferable for measurement of either the X-stabilizers or Z-stabilizers or both. In that case the control system can be instructed to execute an alternative order of CZ gates. Alternatively, for X stabilizers, the "Z" shape order can be implemented by exchanging D4 with D3 and exchanging D1 with D2 in the first 4 of the 8 CZ gates. Alternatively, for Z stabilizers, the "Z" shape order can be implemented by exchanging D4 with D3 and exchanging D1 with D2 in the final 4 of the 8 CZ gates.

The control system in the present invention, or another control system synchronized with the mentioned control system, will control timing and execution of the control pulses to perform single-qubit gates, the single-qubit gates being executed at the times as shown in FIG. 10.

In exemplary embodiment, measurement of X ancillary qubits can be done parallel with Z-gates, according to FIG. 10.

In exemplary embodiment, measurement of Z ancillary qubits can be done parallel with X-gates, according to FIG. 10.

Alternatively, measurements can be done in parallel with other operations on data qubits, such as for performing single-qubit gates on the data qubits, e.g. to perform logical single-qubit gates, according to FIG. 10.

Alternatively measurement of X-ancillary qubits can be done prior to performing the CZ gates on the Z ancillary qubits, enabling operations on both the data qubits and all ancillary qubits prior to the new QEC cycle, according to FIG. 10.

Figure 8:
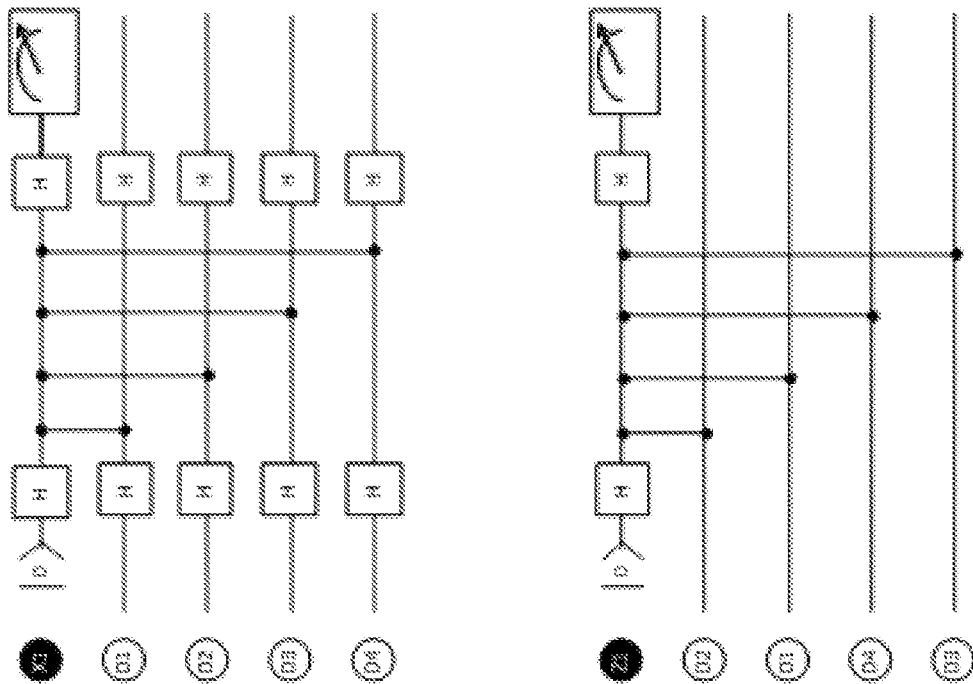
FIG. 8 shows the QEC cycle with CZ gates to measure the X and Z stabilizers ("S" order) using the qubit identifiers of the 8-qubit unit cell. Note that the data qubits in a gate circuit do not necessarily belong to the same unit cell but may lay in a neighboring unit cell.
Figure 8:
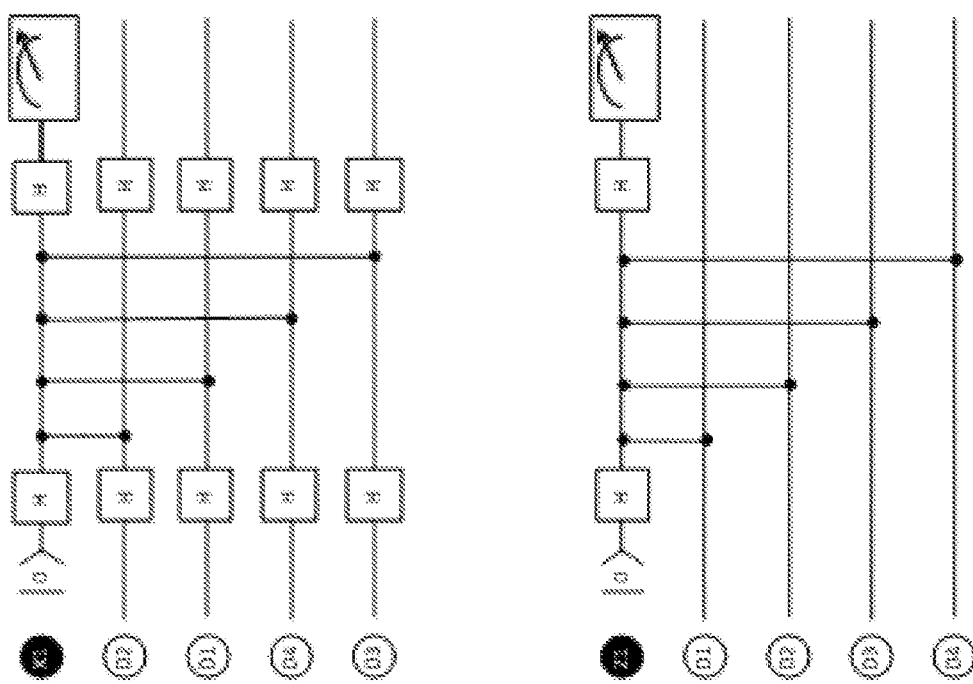
Figure 9:
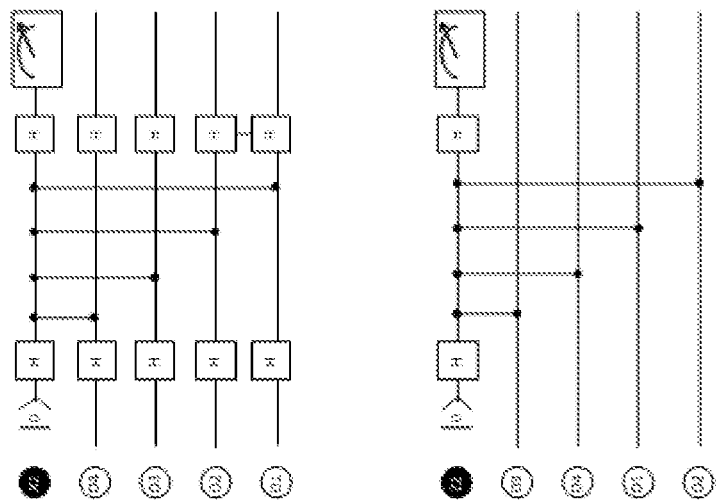
FIG. 9 shows the QEC cycle with CZ gates to measure the X and Z stabilizers ("Z" order) using the qubit identifiers of the 8-qubit unit cell. Note that the data qubits in a gate circuit do not necessarily belong to the same unit cell but may lay in a neighboring unit cell.
Figure 9:
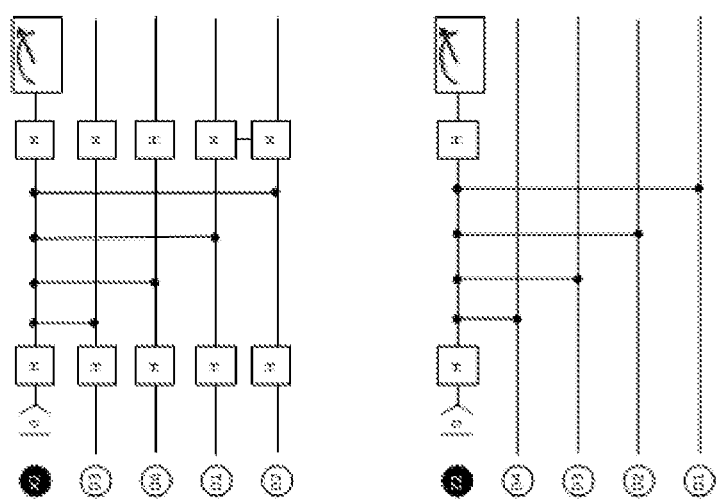

In an exemplary embodiment of the present invention, the quantum chip may contain a plurality of qubits, layout according to FIG. 4. The number of qubits in the horizontal direction may differ from the number of qubits in the vertical direction. At the edges of this 2D plane, the unit cells may contain less than 8 qubits. For these incomplete unit cells, the physical wiring for the control pulses can simply be omitted. The control scheme shown in FIG. 8 will then perform so-called 2-point stabilizer measurements including only 2 data qubits for one neighboring ancillary qubit.

Within the plurality of physical qubits, logical qubits may be defined by performing stabilizer measurements according to the method described for example in [A. G. Fowler, M. Mariantoni, J. M. Martinis, and A. N. Cleland—Surface codes: Towards practical large-scale quantum computation, phys. rev. A 86, 032324 (2012)]. These may be planar qubits or defect qubits. Operations on these logical qubits are generally performed by switching on and off (select or de-select) stabilizer measurements for specific ancillary qubits. In an exemplary embodiment of the present invention, the selection/de-selection of stabilizer measurements can be performed by programming the control system: by not executing the Hadamard gates at the beginning and end of each stabilizer measurement (see FIG. 8: step 0C and 5A for X-stabilizers, step 5C and 0A for Z-stabilizer), the stabilizer is effectively not measured/executed. In an exemplary embodiment of the present invention this can be programmed in advance for deterministic execution of logical operations. If the execution of the logical gates is not deterministic but depends on intermediate results, the control system can be implemented as a realtime control system.

Figure 16:
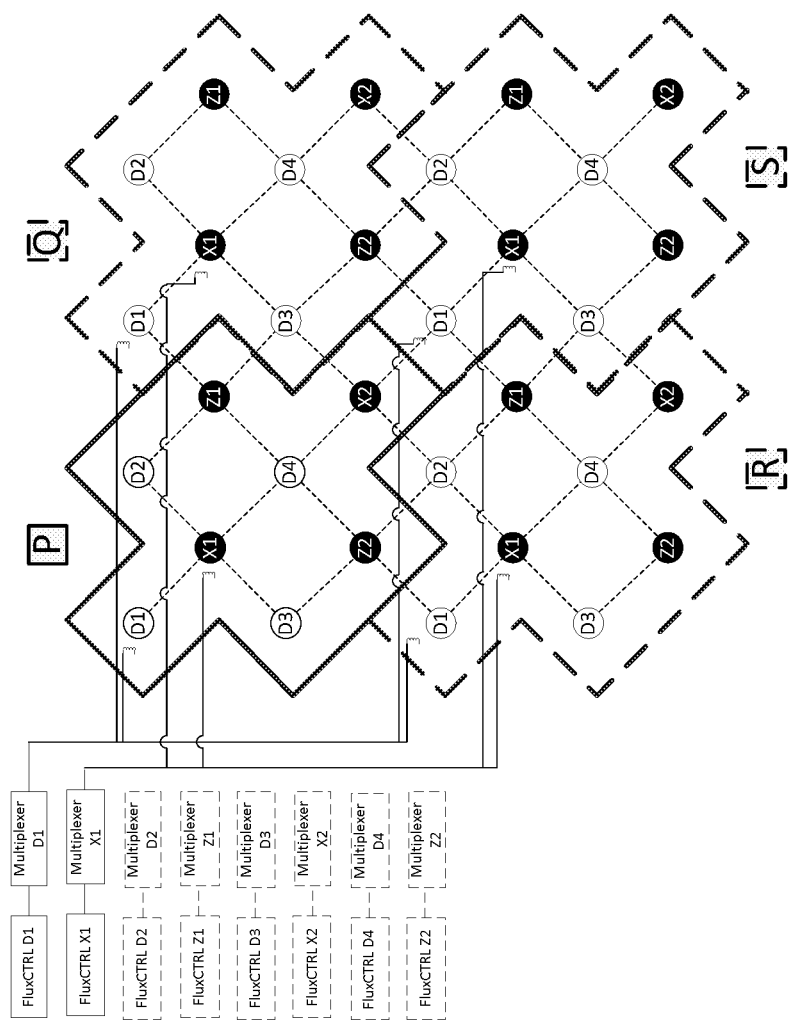
FIG. 16 illustrates multiplexing of the 8 detuning signals per unit cell to multiple unit cells. Only the signal lines for D1 and X1 are shown for readability. Each of the signal lines between the multiplexer and the qubits may contain a controllable switch (not show in the figure).

In an exemplary embodiment of the present invention, the physical control pulses (e.g. voltage pulses or current pulses) to perform the detuning of the qubits in one unit cell is multiplexed to all unit cells in the system, e.g. as illustrated by FIG. 16. In a preferred embodiment of the present invention, the fan-out to multiple unit cells is performed by a fan-out system located close to or at the quantum chip. This way, the number of electrical wires from the room-temperature control systems to generate the flux pulses for one unit-cell is only determined by the number of qubits in the unit cell (i.e. 8) instead of the number of qubits in the quantum chip, thereby minimizing the heat load by conduction through these electrical wires from room temperature to qubit operating temperature. Multiplexing systems for signals between DC and 5 GHz are known per se from the general field of RF technology.

Further Embodiments

In another embodiment of the present invention, data qubits within a unit cell that have the same frequency for single-qubit control (whether it is f1, f2 or f3) may yet be placed at slightly different frequencies without affecting the scope of the present invention. As an example, qubit D1 can be placed at a frequency f1* that is higher than frequency f1. This may be beneficial because it reduces the residual coupling between D1 and D2 during single-qubit operations. This requires a different detuning for the two qubits (D1 being detuned from f1* to f1" and D2 being detuned from f1 to f1") which will increase the number of unique detuning pulses. Likewise, D3 can be placed at a frequency f3* lower than f3 but higher than f3'. This requires a different detuning for ancilla qubits X1, X2, Z1 and Z2, which then need to be detuned to frequency f3* instead of f3 when they need to interact with qubit D3. In another embodiment of the present invention, fast cryogenic switches may be present in the multiplexer/fan-out system to selectively transmit or block the flux pulses to the qubits. This is an alternative way to select/de-select the execution of X-stabilizers, Z-stabilizers or both for all ancillary qubits on the quantum chip. The isolation value of the switches must be good enough to decouple the current/voltage source input signal from the Josephson-junctions in the qubit, typical values may be between 50 and 120 dB. The switches must be fast enough and accurately timed between the pulses by the control system. Rise and fall time may typically be between 10 ps and 10 ns, depending on the duration of the CZ gates and timing accuracy may also typically be between 10 ps and 10 ns, depending on the dead-time between consecutive CZ pulses.

In another embodiment of the present invention, actively or passively controlled amplifiers or attenuators (current adaptors) are present at the output of the fan-out system. One current adaptor is present for each qubit in the quantum chip in order to compensate for small differences between the (nominally equal) qubits with equal labels. Using this method small differences in transition frequencies or anharmonicity require slightly different flux pulses in order to perform the CZ gates. The current adaptors compensate by changing the amplitude of the flux current. The required compensation can be determined by calibration of the CZ gates. In a preferred embodiment of the present invention, one current adaptor is present for each qubit in the quantum chip. Typical manufacturing capabilities for Josephson-junction qubits result in qubits that are nominally the same within a few percent at the present state of engineering. Therefore current adaptors compensating by a few percent, typically up to 5% are needed. Current adaptors are known per se from the field of electrical engineering. Preferably the current adaptors will have very low thermal output in order to minimize the heat load to the cooling system of the quantum chip in order to keep the quantum chip at the required operating temperatures (typically between 5 mK and 100 mK). In an even more preferred embodiment of the present invention, the calibration of the flux pulses is performed before operating the quantum chip and the current adaptors are passive components in the fan-out system. This way thermal output will even be decreased even further.

The invention claimed is:
1. A method for executing a quantum error correction cycle in a quantum computer provided with a substrate of qubits arranged in repeated unit cells, wherein a data qubits are coupled to respective X-ancillary qubits and Z-ancillary qubits, wherein the X-ancillary qubits are capable of measuring a first quantum variable and the Z-ancillary qubits are capable of measuring a second quantum variable of said data qubits by a nearest neighbor interaction provided only between said data qubits and said ancillary qubits, wherein said nearest neighbor interaction is provided by detuning a transition frequency of any of the data qubits and ancillary qubits into a coupling frequency for providing a coherent 2-qubit gate, and wherein said method comprises:
providing a plurality of the data qubits on a first grid, wherein a unit cell comprises four data qubit; and
providing a plurality of X-ancillary qubits and Z-ancillary qubits on a second grid, said second grid shifted relative to the first grid, so that one of the ancillary qubits is central to the four data qubits of the unit cell, and the X-ancillary qubits and Z-ancillary qubits are each further arranged in respective diametral positions relative to one of the data qubits of the unit cell, said unit cell thereby further comprising two X-ancillary qubits and two Z-ancillary qubits;
wherein each one of the data qubits of each unit cell is subsequently brought in a coupling resonance with any of the X-ancillary qubits and Z-ancillary qubits by:
simultaneous coupling of first ones of the ancillary qubits with a respective neighboring data qubit; and subsequent couplings of said first ones with the other neighboring data qubits; followed by
simultaneous coupling of second ones of the ancillary qubits with a neighboring data qubit; and subsequent couplings of said second ancillary qubit with the other neighboring data qubits,
wherein a first data qubits are kept operating at a first frequency, a second data qubits are kept operating at a third frequency on said grid, and said ancillary qubits are kept operating at a second frequency between said first and third frequencies; wherein a coupling frequency is provided by detuning any of the first data qubits in an intermediate frequency between the first and second frequency; wherein a coupling frequency is provided by detuning any of the ancillary qubits in an intermediate frequency between the second and third frequency, and wherein said first frequency, said second frequency and said third frequency are sufficiently different to avoid coupling of the data qubits and the ancillary qubits outside the coupling frequency, or
wherein a first pair of the ancillary qubits are kept operating at a first frequency, a second pair of the ancillary qubits are kept operating at a third frequency, and said data qubits are kept operating at a second frequency between said first frequency and said third frequency; wherein a coupling frequency is provided by detuning any of the first pair of the ancillary qubits in an intermediate frequency between the first frequency and the second frequency; wherein a coupling frequency is provided by detuning any of the data qubits in an intermediate frequency between the second frequency and the third frequency, and wherein said first frequency, said second frequency and said third frequency are sufficiently different to avoid coupling of the data qubits and the ancillary qubits outside the coupling frequency.

2. The method according to claim 1, wherein said first frequency, said second frequency, and said third frequency are sweet-spot frequencies for the data qubit and ancillary qubits.

3. The method according to claim 1, wherein said four data qubits in the unit cell are provided on a grid in top right, top left, bottom right and bottom left positions; and said subsequent couplings are carried out in NE, NW, SE, SW order.

4. The method according to claim 1, wherein said four data qubits in the unit cell are provided on a grid in a top right, a top left, it bottom right and a bottom left positions; and said subsequent couplings are carried out in the top left, top right, bottom left and bottom right order.

5. The method according to claim 1, wherein,
simultaneously with said coupling of first ones of the ancillary qubits with a respective neighboring data qubit, any coupling between said second ones of the ancillary qubits and the data qubit, is avoided by detuning said second ones of the ancillary qubits in an intermediate frequency between said second frequency and the coupling frequency between the second and third frequency; and any coupling between any of said data qubits and any said ancillary qubits is avoided by detuning a data qubit, any time when the data cubit is not participating in any of said subsequent couplings, to a frequency below said third frequency, and simultaneously with said coupling of second ones of the ancillary qubits with a respective neighboring data qubit; any coupling between said first ones of the ancillary qubits is avoided by detuning said first ones ancillary qubits in an intermediate frequency, between said second frequency and the coupling frequency between the second and third frequency; and any coupling between any of said data qubits and any said ancillary qubits is avoided by detuning a data qubit, any time when the data qubit is not participating in any of said subsequent couplings, to a frequency below said third frequency.

6. The method according to claim 1, wherein, simultaneously with said coupling of first ones of the ancillary qubits with a respective neighboring data qubit, any coupling between said second ones of the ancillary qubits and the data qubits is avoided by detuning said second ones of the ancillary qubits to a frequency below said third frequency; and any coupling between any of said data qubits and any said ancillary qubits and is avoided, by detuning a data qubit, any time when the data qubit is not participating in any of said subsequent couplings, to a frequency between said second frequency and said coupling frequency, simultaneously with said coupling of second ones of the ancillary qubits with a respective neighboring data qubit, any coupling between said first ones of the ancillary qubits and the data qubits is avoided by detuning said first ones of the ancillary qubits to a frequency below said third frequency; and any coupling between any of said data qubits and any said ancillary qubits is avoided, by detuning any data qubit, any time when the data bit is not participating in any of said subsequent couplings, to a frequency between said second frequency and said coupling frequency.

7. The method according to claim 1, wherein said coupling is performed by a Controlled Phase (CZ) gate.

8. The method according to claim 7, wherein said CZ gate is performed by exploiting the qubits avoided crossing between the |11> state and |02> or |20> state or higher non-computational states.

9. The method according to claim 1, wherein said data qubits and ancillary qubits comprises an oscillator circuit including a split Josephson-junction.

10. The method according to claim 9, wherein the Josephson-junction qubit operates in a charge mode.

11. The method according to claim 9, wherein the Josephson-junction qubit operates in a phase mode.

12. The method according to claim 9, wherein said detuning is provided by varying a magnetic flux in the oscillator circuit.

13. The method according to claim 1, wherein the data qubits, X-ancillary qubits and Z-ancillary qubits are provided with a magnetic flux control line that is operated in a multiplexed way for controlling the flux for detuning any of the first, second and third frequencies.

14. The method according to claim 1, wherein said qubits are weakly negative anharmonic, such that the separation between said first and second operating frequencies, respectively between said second and third operating frequencies is larger than the absolute value of the anharmonicity.

15. The method according to claim 1, wherein said detuning is current based or voltage based.

16. The method according to claim 1, wherein single qubit hadamard gates are executed on all or part of said data qubits or ancillary qubits and measurements are performed on second ones of the ancillary qubits simultaneously with said coupling of first ones of the ancillary qubits, and measurements are performed on the first ones of the ancillary qubits simultaneously with said coupling of the second ones of the ancillary qubits, the total combination of single qubit gates, controlled phase gates and measurements yielding an eigen states of a stabilizers of the of the qubit substrate.

17. A quantum computer provided with a substrate of qubits arranged in repeated unit cells, wherein a data qubits are coupled to respective X-ancillary qubits and Z-ancillary qubits, wherein the X-ancillary qubits are capable of measuring a first quantum variable and the Z-ancillary qubits are capable of measuring a second quantum variable of said data qubits by a nearest neighbor interaction provided only between said data qubits and said ancillary qubits, wherein said nearest neighbor interaction is provided by detuning a transition frequency of any of the data qubits and ancillary qubits into a coupling frequency for providing a coherent 2-qubit gate, wherein a plurality of data qubits are provided on a first grid, wherein a unit cell comprises four data qubits; wherein a plurality of the X-ancillary qubits and the Z-ancillary qubits are provided on a second grid, and said second grid is shifted relative to the first grid so that one of the ancillary qubits is central to the four data qubits of the unit cell, and the X-ancillary qubits and Z-ancillary qubits are each further arranged in respective diametral positions relative to one of the data qubits of the unit cell, and said unit cell thereby further comprises two X-ancillary qubits and two Z-ancillary qubits; wherein each one of the data qubits is arranged to be subsequently brought in a coupling resonance with any of the X-ancillary qubits and Z-ancillary qubits by simultaneous coupling of a first ones of the ancillary qubits with a respective neighboring data qubit; and subsequent couplings of said first ones of the ancillary qubits with the other neighboring data qubits; followed by simultaneous coupling of a second ones of the ancillary qubits with a neighboring data qubit; and subsequent couplings of said second ancillary qubit with the other neighboring data qubits, wherein a first data qubits are kept operating at a first frequency, a second data qubits are kept operating at a third frequency on said grid, and said ancillary qubits are kept operating at a second frequency between said first and third frequencies; and wherein a coupling frequency is provided by detuning any of the first data qubits in an intermediate frequency between the first frequency and the second frequency; and wherein a coupling frequency is provided by detuning any of the ancillary qubits in an intermediate frequency between the second frequency and the third frequency, and said first frequency, said second frequency, and said third frequency are sufficiently different to avoid coupling of the data qubits and the ancillary qubits outside the coupling frequency, or wherein a first pair of the ancillary qubits are kept operating at a first frequency, a second pair of the ancillary qubits are kept operating at a third frequency, and said data qubits are kept operating at a second frequency between said first frequency and said third frequency; and wherein a coupling frequency is provided by detuning any of the first pair of the ancillary qubits in an intermediate frequency between the first frequency and the second frequency; and wherein a coupling frequency is provided by detuning any of the data qubits in an intermediate frequency between the second frequency and the third frequency, and said first second and said third frequency are sufficiently different to avoid coupling of the data qubits and the ancillary qubits outside the coupling frequency.

* * * * *